US009143916B2

(12) United States Patent
Bhanage et al.

(10) Patent No.: US 9,143,916 B2
(45) Date of Patent: Sep. 22, 2015

(54) HYBRID WIRELESS VIRTUALIZATION ARCHITECTURE

(75) Inventors: Gautam Bhanage, Sunnyvale, CA (US); Sachin Ganu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/489,253

(22) Filed: Jun. 5, 2012

(65) Prior Publication Data

US 2013/0100807 A1    Apr. 25, 2013

Related U.S. Application Data

(60) Provisional application No. 61/549,051, filed on Oct. 19, 2011.

(51) Int. Cl.
*H04W 4/26* (2009.01)
*H04L 12/24* (2006.01)
*H04M 15/00* (2006.01)

(52) U.S. Cl.
CPC ............. *H04W 4/26* (2013.01); *H04L 41/5029* (2013.01); *H04M 15/8016* (2013.01)

(58) Field of Classification Search
USPC .................................. 370/232, 237, 329, 338
See application file for complete search history.

(56) References Cited

U.S. PATENT DOCUMENTS

| 2007/0025289 | A1* | 2/2007 | Nandagopalan | 370/329 |
| 2009/0059873 | A1* | 3/2009 | Weil et al. | 370/338 |
| 2010/0111056 | A1* | 5/2010 | Schmitt et al. | 370/338 |
| 2011/0058478 | A1* | 3/2011 | Krym et al. | 370/237 |
| 2012/0166622 | A1* | 6/2012 | Draznin et al. | 709/224 |
| 2013/0094486 | A1* | 4/2013 | Bhanage et al. | 370/338 |

OTHER PUBLICATIONS

Floyd et al., "Modifying TCP's Congestion Control for High Speeds", May 5, 2002, pp. 1-5.
Ha et al., "TCP Fairness for Uplink and Downlink Flows in WLANs", IEEE proceedings Global Telecommunications Conference, GLOBECOM '06, 2006, 5 pages.
Kashibuchi et al., "Channel Occupancy Time Based TCP Rate Control for IEEE 802.11 DCF", International Wireless Communications and Mobile Computing Conference, IWCMC '08, Aug. 6-8, 2008, pp. 932-937.
Keceli et al., "TCP ACK Congestion Control and Filtering for Fairness Provision in the Uplink of IEEE 802.11 Infrastructure Basic Service Set", IEEE International Conference on Communications, ICC '07, Jun. 24-28, 2007, pp. 4512-4517.
Xu et al.,"Balancing Throughput and Fairness for TCP Flows in Multihop Ad-Hoc Networks", 5th International Symposium on Modeling and Optimization in Mobile, Ad Hoc and Wireless Networks and Workshops, 2007 WiOpt 2007, Apr. 16-20, 2007, 10 pages.

* cited by examiner

*Primary Examiner* — Albert T Chou

(57) ABSTRACT

According to one embodiment of the invention, a method for optimizing revenue for an operator of a network comprises receiving control information by a network device. The control information includes a first airtime representing an amount of airtime used for wireless data transmissions to a first group of network devices. The method further involves an operation of computing an airtime allocation for the first group of network devices based on the first airtime and lease rates. The lease rates are prices per unit of airtime to be paid by an operator associated with one or more of the network devices.

20 Claims, 9 Drawing Sheets

HYBRID WIRELESS VIRTUALIZATION ARCHITECTURE

CROSS-REFERENCE TO RELATED APPLICATIONS

This application is based upon and claims the benefit of priority from U.S. Provisional Patent Application No. 61/549,051 filed Oct. 19, 2011, the entire contents of which are incorporated herein by reference.

FIELD

Embodiments of the present disclosure relate to the field of wireless communications, and in particular a hybrid wireless virtualization (HWV) controller adapted to operate across heterogenous virtualized radio technologies for optimizing network operator revenue and/or data throughput through use of a common measurement metric.

BACKGROUND

Until fairly recently, cellular telephone networks were implemented and managed separately from wireless networks (e.g., wireless local area networks "WLANs", Wi-Fi™ hot spots, etc.). There were a number of reasons why these two networking platforms were initially implemented and managed separately. For instance, mobile network operators typically were unable to leverage existing resources (e.g. hardware, software, personnel, etc.) to support both cellular services and wireless services. The resources needed for supporting transmissions over a cellular band are quite different from resources needed to support transmissions over a wireless frequency band. Furthermore, the fiscal benefits in supporting multiple types of communication services were not present at that time.

Recently, however, there has been a proliferation of dual-mode devices into the consumer marketplace. Dual-mode devices enable Internet connectivity through different communication services, namely cellular services and wireless services. This provides consumers with greater flexibility in downloading data according to a selected characteristic—cost effectiveness, fastest download rate or most reliable connection.

With the proliferation of dual-mode devices, mobile network operators have begun to recognize the operational benefits in providing multiple avenues to offload certain data traffic as well as the fiscal benefits that are realized by supporting higher levels of data traffic. For instance, mobile network operators are able to lease excess capacity on their underlying physical networks to multiple entities through wireless virtualization. "Wireless virtualization" refers to the running of multiple virtual networks which are leased to mobile virtual network operators (MVNOs) by the mobile network operator (MNO), the entity owning the underlying physical network.

Wireless virtualization is an approach where underlying physical network interfaces are abstracted by more than one virtual interface, which enables better sharing of the physical interface and the medium used by the radio associated with that virtual interface. Virtualization usually involves the application of three fundamental concepts for sharing a resource: (1) abstraction, (2) programmability, and (3) isolation. "Abstraction" ensures that the same interface is available to all the virtual entities using the systems. "Programmability" ensures that each of the virtual interfaces is able to affect properties of the underlying physical interface without conflicting with the requirements of other virtual entities. Lastly, "isolation" is a property which ensures that the load on one virtual entity does not affect the other, and essentially, each of the virtual interfaces is able to work independent of each other.

Therefore, since networks are designed to provide access to different types of virtualized radio platforms, a mechanism is needed for supporting these different types of radios for achieving optimal revenue recovery and/or aggregated throughput.

BRIEF DESCRIPTION OF THE DRAWINGS

Embodiments of the present invention are illustrated by way of example, and not by way of limitation, in the figures of the accompanying drawings and in which.

DETAILED DESCRIPTION

Figure 1:
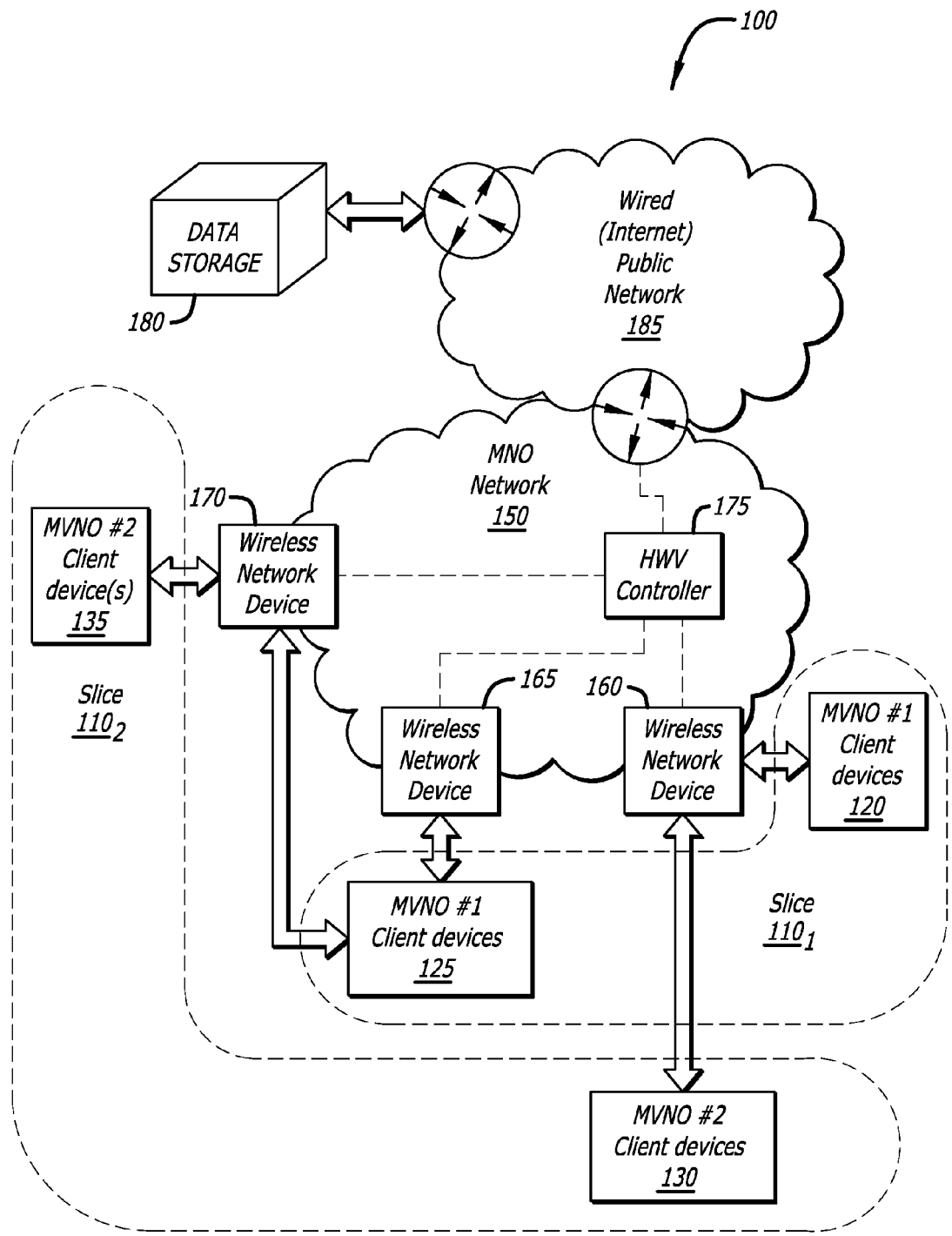
FIG. 1 is an exemplary block diagram illustrating one embodiment of a virtualized network architecture that features a plurality of virtualized wireless platforms.

In the following description, several specific details are presented to provide a thorough understanding. While the context of the disclosure is directed to provisioning and managing virtualized heterogeneous radios, one skilled in the relevant art will recognize, however, that the concepts and techniques disclosed herein can be practiced without certain details such as one or more operations, certain logic, or the like. In other instances, well-known implementations or operations are not shown or described in detail to avoid obscuring aspects of various examples disclosed herein. It should be understood that this disclosure covers all modifications, equivalents, and alternatives falling within the spirit and scope of the present disclosure.

General Overview

This disclosure illustrates exemplary embodiments of a hybrid wireless virtualization (HWV) controller based network architecture. By using the HWV controller or its functionality, a unified approach can be taken for provisioning and managing virtualized heterogeneous radios, irrespective of their Medium Access Control (MAC) and Physical Layer (PHY) mechanisms. It is shown that the airtime occupancy for communications with different "slices" (e.g., different groups of wireless network devices) can be used as a single metric for controlling different virtualized platforms. The HWV controller can account and dynamically re-provision "slice quotas", namely airtime constraints for different wireless network devices within a particular slice, in order to maximize network operator revenue and/or aggregate system throughput performance. In fact, simulations have shown that an HWV controller based infrastructure is able to improve the revenue generated from a single virtualized base station (BTS) and an access point (AP) by up to forty percent (40%) under tested conditions.

The design goals of a hybrid wireless virtualization (HWV) system controller can be crystallized into the following requirements. First, the network architecture should support virtualization and resource allocation across multiple wireless network devices that are owned by the mobile network operator (MNO). Such support should be independent of the type of the wireless network device. For example, these devices could be second generation (2G) base stations, 3G base stations, 4G base stations, access points, WiFi™ hotspots, or wireless meshes. Second, the HWV controller should be able to dynamically re-provision and control the virtualized network such that the network operator benefits irrespective of time varying operating conditions. Lastly, in order to ensure that these goals are met, a HWV controller should use a common metric for measurement and policy enforcement across multiple virtualized radios owned by the network operator in lieu of multiple metrics.

A. Metric Selection

For the purpose of link and user performance measurements, numerous metrics (e.g., throughput, goodput, delay performance) have been previously used. These metrics have also been used for resource provisioning on scheduled MAC mechanisms. For example, in a WiMAX™ base station, the system administrator can specify the number and types of flows in a service class, with each class having a minimum/maximum throughput and delay constraints. However, these metrics are not suitable for the HWV architectures because they do not translate into the use of the same amount of radio resources on any type of radio.

For example, the same amount of throughput can be achieved by using different physical layer (PHY) rates on two different links. However, the link with the slower PHY rate uses more radio resources to achieve the same throughput as that by a link with a faster PHY rate. In order to remove these, and other differences in resource usage induced by the MAC layer, such as channel access time, MAC and PHY overheads, MAC enhancements (like custom or standard aggregation mechanisms) and the nature of the MAC itself (scheduled or unscheduled), radio airtime is used as a single (universal) metric for control of the virtualized framework.

In particular, "$t_j$" is the fraction of airtime that is used by a radio for wireless transmission, and $t_j$ directly translates into the resources on every wireless network device. This fraction of airtime $t_j$ can be used as a single metric for resource accounting on a scheduled MAC mechanism as well as unscheduled MAC. Consider that "$\mu_j$" represents the number of resource blocks allocated to slice "j" by a MAC scheduler of a wireless network device. In this case, it can always be experimentally verified that:

$$t_j = \frac{\mu_j}{\sum_j \mu_j} = \frac{rate_j}{rate_j^{phy}}; \quad (1)$$

This is the case because airtime utilization of a slice is a direct result of such MAC scheduling. In any radio, the airtime fraction is also equivalent to the aggregate throughput $rate_j$ achieved by slice j, as a fraction of the assigned average physical $rate_j^{phy}$ for the slice. Hence, irrespective of having a scheduled MAC (in a base station) or an unscheduled CSMA MAC (in an AP), airtime can be used as a single metric for accounting and controlling slice radio resource usage.

Based on this insight, the design of the HWV controller (described below) takes into account resource usage across different virtualized network components, and will be responsible for dynamically re-provisioning these components for network operator revenue optimization or plain rate maximization.

B. HWV Controller

The HWV controller is responsible for getting airtime usage, and rate feedback from each of the virtualized components, namely wireless network devices such as base stations and APs. It is also responsible for re-provisioning them so that the network operator's profit is maximized. The virtual base station architecture and the modified SplitAP framework enforce group airtime fairness across slices.

Let the airtime quota requested per slice across a group of base stations be specified by the set Q={Q1, ..., Qn}. Let the airtime allocated per slice j at every base station k be given as "$t_j^k$". Similar quotas Q^={Q^1, ..., Q^n} are specified for the same set of slices over a set of access points (APs). Let the airtime allocated per slice j at every access point k be given as $\hat{t}_j^k$. Similarly, let the requested airtime per slice per base station or access point be given as $r_j^k$ and $\hat{r}_j^k$, respectively. The requested airtime is updated at runtime for every iteration at which revenue/throughput optimization is performed. Corresponding usage flags for base stations and access points are given as: $u_j^k$ and $\hat{u}_j^k$.

The overall revenue function across the set of base stations and access points owned by the operator is defined as:

$$\text{Rev}(t_j^k) = t_j^k \times \Gamma_j(r_j^k) \quad (2)$$

$$\text{Re}\hat{v}(t_j^{\hat{k}}) = t_j^{\hat{k}} \times \hat{\Gamma}_j(r_j^{\hat{k}}) \quad (3)$$

According to one embodiment of the invention, the revenue functions are linear, namely the product of the slice allocation for a particular resource (e.g., base station or AP) and a constant "C" that represents the cost per unit time. For example, if a slice gets fifty percent (50%) of the AP, and through some previous agreement between the MVNO and MNO, it is known how much cost C the MVNO is willing to incur for the entire resource, the revenue can be estimated based on these factors.

To keep the analysis simple, it is contemplated that "C" is a constant. However, based on the agreements between the MNO and MVNO, it could be a function of slice airtime allocation.

More specifically, the revenue is solved, as a linear program, because all functions and constraints are linear. However, if the cost is made non-linear, such as a convex relationship for example, a convex optimization problem could be solved and still find solutions. Also, a current utilization (or load)—amount of airtime used out of the assigned quota to balance allocations—is used, which helps to improve system performance.

Here, $\Gamma_j$ and $\hat{\Gamma}_j$ are the utility functions provided by MVNO j for matching their traffic demands on a base station and access point respectively. For now, the utility functions can be defined as a linear function of the allocated airtimes given as:

$$\Gamma_j(t_j^k) = C_j \quad (4)$$

$$\hat{\Gamma}_j(t_j^k) = \hat{C}_j \quad (5)$$

These equations indicate a purely increasing utility with increasingly allocated capacity. Eventually, the values $C_j$ and $\hat{C}_j$ can be equated to the average physical rates available for the clients belonging to the slices j on base stations and access points. Information of the average physical layer rates, and the overall traffic flowing to the clients is available at the controllers of both the virtual base station framework and the SplitAP design and these can be polled regularly by the HWV controller. In an initial evaluation of the setup, $C_j$ and $\hat{C}_j$ may be set to be equal to average of the slice physical layer rates to the clients. This eliminates the pricing component from the objective function, and the problem becomes a rate maximization problem. Eventually, the revenue optimization function of the controller is demonstrated by substituting linear objective functions of achieved rate for $C_j$ and $\hat{C}_j$. The problem being solved at the HWV controller mat be formulated as:

$$\text{maximize} \sum_j \sum_k Rev(t_j^k) + \hat{Rev}(t_j^k) \quad (6)$$

$$\text{subject to} \sum_j t_j^k \leq 1, j = 1, \ldots, m. \quad (7)$$

$$\sum_k t_j^k \leq Q_j, k = 1, \ldots, n.$$

$$\forall_{j,k} \; t_j^k \geq \delta_j^k,$$

$$\sum_j \hat{t}_j^k \leq 1, j = 1, \ldots, m.$$

$$\sum_k \hat{t}_j^k \leq \hat{Q}_j, k = 1, \ldots, n.$$

$$\forall_{j,k} \; \hat{t}_j^k \geq \hat{\delta}_j^k,$$

In the above optimization formulation, the "$\delta_j^k$" is used to represent the minimum airtime reservation at the base station k for the slice j. Since the objective function, and all of the constraints are convex, the formulation can be solved at the HWV controller using any standard convex optimization tool or heuristic.

Computing Environment

Herein, certain terminology is used to describe features for embodiments of the invention. For example, a "network device" generally refers to a device that includes logic adapted to transmit and/or receive signaling and to process information within such signaling. Different embodiments of a network device may include, but are not limited or restricted to (1) a wireless client device being any data processing equipment such as a computer with wireless connectivity (e.g., tablet, laptop, desktop, server, a netbook, etc.), a wireless communication device (e.g., a cellular telephone, personal digital assistant "PDA", television, set-top box, etc.); (2) an access point, (3) a base station; (4) a data transfer device (e.g., network switch, router, controller, brouter, etc.), or the like.

It is contemplated that the network device may include hardware logic, including one or more of the following: (i) a processor; (ii) one or more radios (e.g., component that handles the wireless data transmission/reception); (iii) physical connectors to support wired connectivity; and (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive).

Additionally, the term "logic" is generally defined as hardware and/or software. As hardware, logic may include processing circuitry (e.g., a microcontroller, a microprocessor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

Additionally, the term "slice" denotes a group of wireless client devices having a common mobile virtualized network operator (MVNO). An "allocation interval" is a period of time between allocation cycles, namely the time between neighboring assignments of airtime to MVNO(s) forming the virtualized network. The allocation interval may be in units of microseconds, milliseconds, seconds, or even longer durations such as minutes, hours, or days.

The term "interconnect" is broadly defined as a logical or physical communication path such as, for instance, electrical wire, optical fiber, cable, bus trace, or a wireless channel using infrared, radio frequency (RF), or any other wireless signaling mechanism. The term "message" constitutes any grouping of data in the form of a packet, an Asynchronous Transfer Mode (ATM) cell, a frame, or any series of bits having a prescribed format.

Lastly, the term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the invention, albeit the invention may be practiced through many embodiments other that those illustrated. Well-known logic and operations may not be set forth in detail in order to avoid unnecessarily obscuring this description. Moreover, the illustrated embodiments of the invention, and the description associated therewith, should be considered as examples of the principles of the invention and not intended to limit the invention to those specific embodiments. In the description below, like reference numerals are used to describe the same, similar or corresponding parts in the several views of the drawings.

FIG. 1 is an exemplary block diagram illustrating one embodiment of a virtualized network 100 that features a plurality of slices 110₁-110_N (N≥2) that are in communication with a MNO network 150. Each slice 110₁, ..., or 110ₙ features one or more wireless client devices associated with a particular mobile virtual network operator (MVNO) and is communicatively coupled to one or more wireless network devices operating as endpoints for MNO network 150.

As illustrated as an exemplary embodiment, a first slice 110₁ features one or more wireless client devices 120 in wireless communications with a first wireless network device 160 being part of MNO network 150. First slice 110₁ also features one or more wireless client devices 125 in wireless communications with both a second wireless network device 165 and third wireless network device 170 that may have radio types different than first wireless network device 160. Similarly, second slice 110₂ features one or more wireless client devices 130 in communication with first wireless network device 160 and one or more wireless client devices 135 in communication with third wireless network device 170.

Herein, according to this embodiment of the invention, both first and second wireless network devices 160 and 165 may be implemented as access points, which support wireless communications in accordance with IEEE 802.1x Standards (e.g., IEEE 802.11, etc.). However, third wireless network device 170 may be implemented as a base station (BTS), which supports cellular communications in accordance with any 2G/3G/4G compliant standards such as Long Term Evolution (LTE) or LTE Advanced, any Code Division Multiple Access (CMDA) based standards (e.g., CDMA2000, CDMA2000 1x, CDMA2000 1xEV-DO, etc.), any Global System for Mobile Communications (GSM) based standard (e.g., Universal Module Telecommunications System "UMTS", Enhanced Data rates for GSM Evolution "EDGE", etc.), WiMax™ related standards (e.g. IEEE 802.16 & IEEE 802.16e), or the like.

Wireless network devices 160, 165 and 170 are communicatively coupled to a hybrid wireless virtualization (HWV) controller 175, which is adapted to receive and process control information from wireless network devices 160, 165 and 170. This control information may include a fraction of airtime ($t_j$) that is used in wireless communications with wireless client devices in slice j using radios implemented within wireless network devices 160, 165 and 170. It is contemplated that, in provisioning and managing virtualized heterogeneous radios according to one embodiment of the invention, at least "$t_j$" is supplied from wireless network devices 160, 165 and 170 to HWV controller 175. The amount of airtime can be computed by wireless network devices 160, 165 and/or 170 based on packet size, modulation scheme, throughput and MAC retries for communications with slices 110₁ and 110₂.

HWV Controller 175 is positioned by taking into account the allocation interval utilized by MNO network 150. If MNO network 150 requires a prompt feedback (e.g., feedback within one second after receipt of signaling from wireless network devices 160, 165 and/or 170 to re-compute the airtime allocation), HWV controller 175 is located proximate to wireless network devices 160, 165 and 170. For instance, HWV controller 175 may be situated physically proximate to wireless network devices 160, 165 and 170 (e.g. physically connected to devices 160, 165 and/or 170 or implemented on network 100), although the functionality of HWV controller may be implemented within any device connected to network 100 or in cloud computing provided externally located device(s) with computing power and communication interface(s). Alternatively, the functionality of the HWV controller 175 may be implemented within one or more of wireless network devices 160, 165 and 170.

HWV Controller 175 is adapted to support communications with a data storage device 180 over wired public network 185 such as the Internet. This enables the HWV controller 175 to store airtime allocations computed by HWV controller 175 for previous allocation cycles, thereby allowing for the use of heuristic information to optimize revenue or aggregated throughput over MNO network 150.

Figure 2:
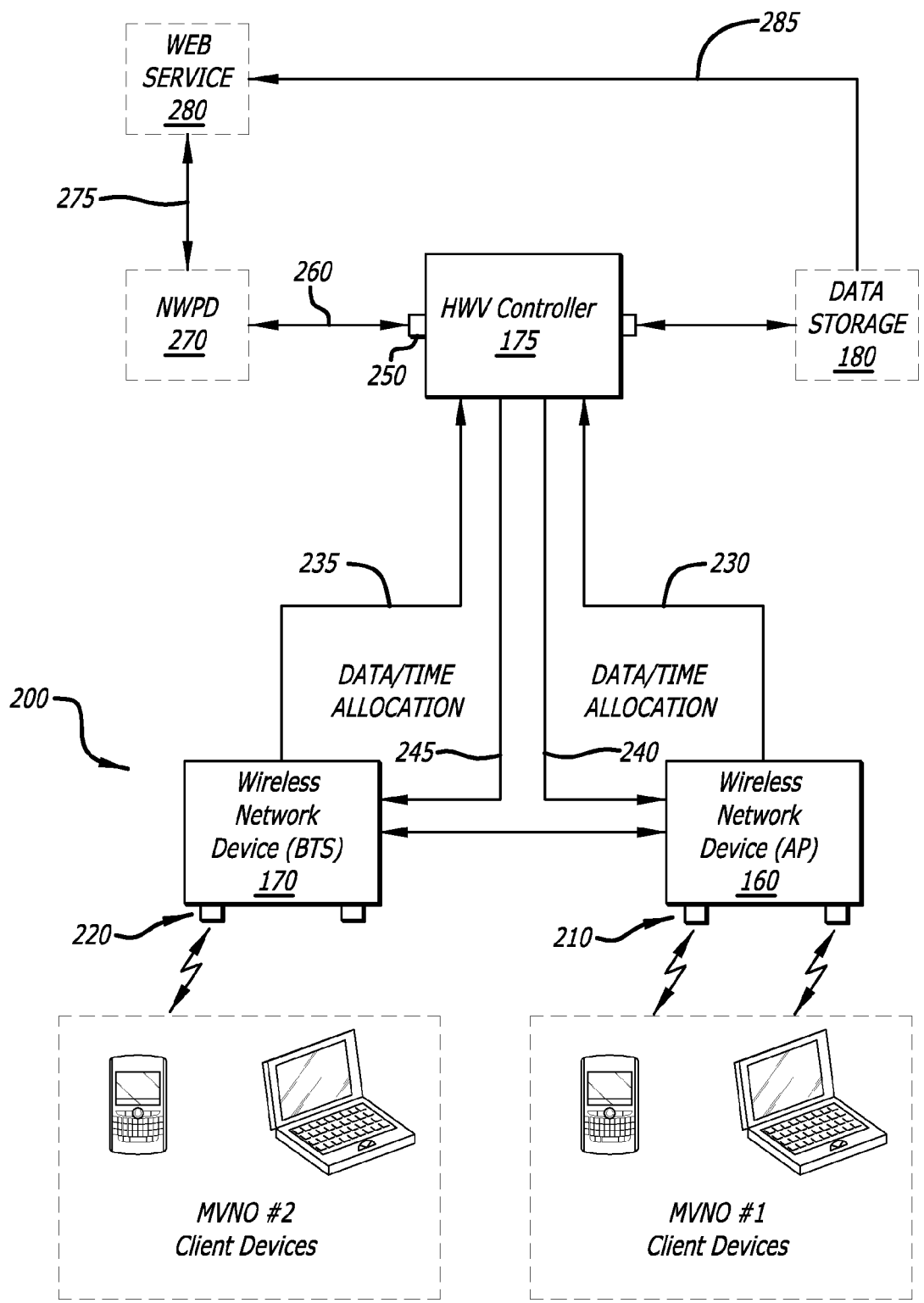
FIG. 2 is an exemplary block diagram illustration of exchanges of information across different interconnects with the HWV controller.

FIG. 2 is an exemplary block diagram illustration of an exchange of information across different links for HWV controller 175. Herein, HWV controller 175 is adapted to receive, inter alia, control information from wireless network devices 200, namely access point (AP) 160 and base station (BTS) 170. According to one embodiment of the invention, the control information comprises a message 230 that includes "$t\hat{\,}_j^k$" being the total amount of airtime utilized in transmissions over one or more radios 210 implemented within wireless network device "k" (e.g., access point 160) for slice j (e.g., a first group of wireless client devices referred to as "MVNO#1"). According to another embodiment of the disclosure, message 230 may include airtimes $ti\hat{\,}_j^k$ for each of the "i" radios (e.g., $t1\hat{\,}_j^k + t2\hat{\,}_j^k$, where i=2), where the sum of the airtimes measured by different radios ($\Sigma ti\hat{\,}_j^k$) is equal to the total amount of airtime for slice j.

Additionally, as HWV controller 175 is adapted to support multiple wireless network devices 200, control information further comprises a message 235 that includes "$t_j^k$" being the total amount of airtime utilized for communications with wireless client devices (slice j) over one or more radios 220 implemented within wireless network device "k" (e.g., base station 170).

Upon receipt of airtime usage, for computations of optimal revenue realized for airtime allocated in the next allocation cycle, HWV controller 175 processes data corresponding to the received airtime usage along with lease rate information associated with MVNOs. The lease rate information is based on cost per prescribed unit of measure, such as cost/data unit (e.g., byte, megabyte, etc.), cost/unit of time (e.g., millisecond, second, minute, etc.), or the like. Based on such processing, HWV controller 175 is able to determine airtime allocation to optimize revenue for leasing out capacity on the MNO network 120. Such information 240 and 245 is provided to wireless network devices (e.g., AP 160 and BTS 170) and may be stored on storage device 180 along with pricing information associated with the MVNOs.

Alternatively, upon receipt of airtime usage, HWV controller 175 may be adapted to process data corresponding to the received airtime usage along with PHY rates associated with different wireless client devices. Based on such data processing, HWV controller 175 is able to determine the allocated airtime to different MVNOs to support optimal throughput over MNO network 150. Such information 240 and 245 is provided to the wireless network devices, and may be stored on storage device 180 along with PHY rates associated with the different wireless client devices.

HWV controller 175 further comprises a connector 250 that is adapted to communicate over a public network interconnect 260 to provide airtime allocation data to HTTP based network wide policy database (NWPD) 270 in response to queries for such information. Connector 250 supports communications through a Simple Network Management Protocol (SNMP) interface. Alternatively, airtime allocation data may be accessed via connector 250 through use of a software driver or an Application Programming Interface (API).

According to one embodiment of the invention, an optional web service 280 may be adapted to send configuration and provisioning information (e.g. operator policies, utility functions, etc.) to NWPD 270. Web service 280 receives usage and revenue statistics from storage device 180.

NWPD 270 is responsible for advertising utility functions because it is envisioned that these functions will change based on time varying agreements between the MNO and the MVNOs. HWV controller 175, as well as other HWV controllers in virtualized network 100, would be configured at deployment time with a Uniform Resource Locator (URL) of NWPD 270, and would be responsible for independently fetching operator policies and utility functions.

It is noted that fetching of information from HWV controller 175 may happen infrequently, depending on the time of the lease agreements between the MNO and the MVNO. NWPD 270 is also adapted to advertise the MNO's revenue generation capabilities through different access mechanisms, namely cellular or wireless communication logic.

Figure 3A:
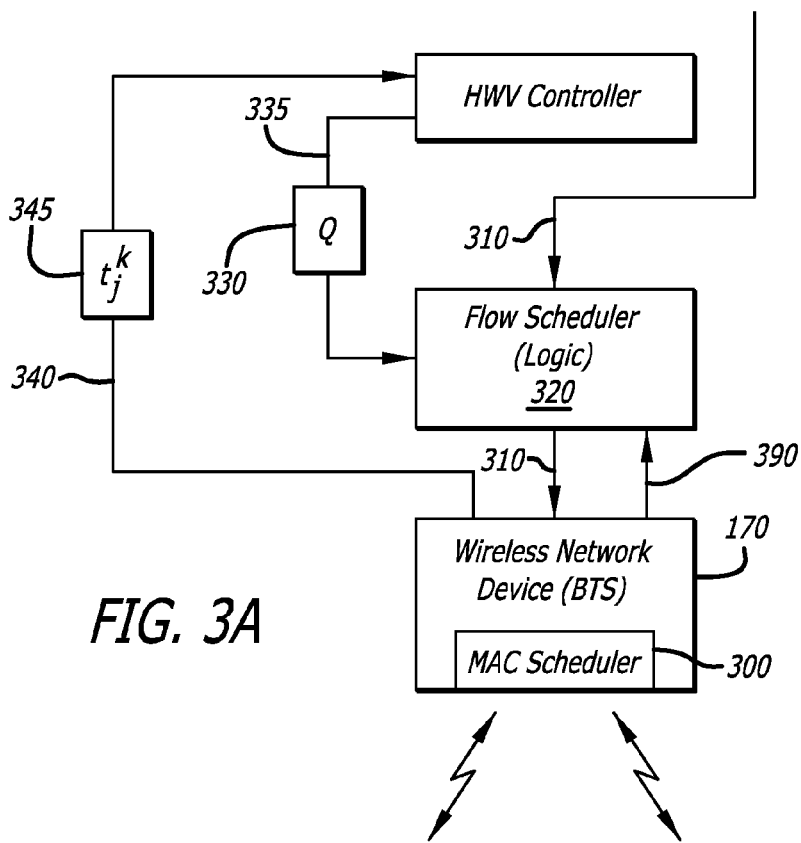
FIG. 3A is an exemplary illustration of logic within a first type of wireless network device of FIG. 2.

FIG. 3A is an exemplary illustration of the operational flow performed, at least in part, by a first type of wireless network device (e.g., base station 170) of FIG. 2 in order to achieve optimal revenue generation. Herein, base station 170 comprises a MAC scheduler 300 that is adapted to control a mapping of data traffic 310 into wireless messages for transmission and the extraction of data traffic from incoming wireless messages.

Interposed between HWV controller 175 and MAC scheduler 300, a flow scheduler 320 is adapted to adjust and control a flow of data targeting different wireless client devices (hereinafter referred to as "data flows") based on airtime allocation quotas (Q) 330 received from HWV controller 175 via a downlink interconnect 335. Such adjustment and control of data is conducted prior to the handling of data flows by MAC scheduler 300. Flow scheduler 310 may be located remotely from base station 170 or within base station 170.

More specifically, it is contemplated that base station 170 is coupled to HWV controller 175 through an uplink interconnect 340 and provides airtime usage $(t_j^k)$ 345, namely the total amount of airtime utilized for slice j (e.g., the group of wireless client devices pertaining to MVNO#1) for all radios within wireless network device "k" (e.g., base station 170). HWV controller 175 is adapted to further receive airtime usage from other virtualized end points.

HWV controller 175 re-provisions airtime to optimize revenue (e.g., maximize revenue, maximum rate, or maximum anticipated return where the likelihood of revenue recovery varies among the lease rates) and/or system throughput. HWV controller 175 provides quota (Q) 330 to flow scheduler 310. Each quota (Q={Q1, . . . , Qk}) identifies airtime allocations for a particular MVNO with a granularity that allows different "k" wireless network devices to support different amounts of airtime for wireless client devices that are part of a particular slice j. Flow scheduler 320 subsequently alters the data provided to MAC scheduler 300 so that prescribe amounts of airtime are permitted for certain data flows.

Figure 3B:
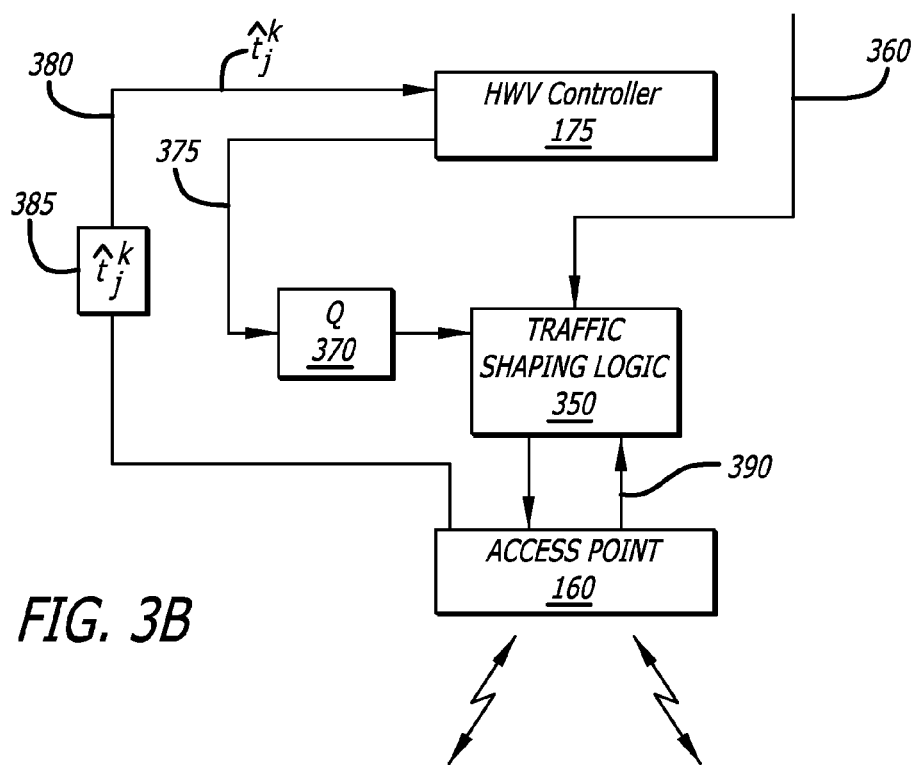
FIG. 3B is an exemplary illustration of logic within a second type of wireless network device of FIG. 2.

FIG. 3B is an exemplary illustration of the operational flow performed, at least in part, by a second type of wireless network device (e.g. access point 160) of FIG. 2 in order to achieve optimal revenue generation. Herein, access point 160 does not feature a MAC scheduler. Rather, access point 160 features traffic shaping logic 350 that is adapted to adjust and control data flows 360 based on airtime allocation quotas 370 received from HWV controller 175 via a downlink interconnect 375. Normally, traffic shaping logic 350 is logic located with access point 160, but may be implemented within an intermediary device between HWV controller 175 and access point 160 or within HWV controller 175.

Access point 160 is coupled to HWV controller 175 through an uplink 380 and provides airtime usage $(t\hat{}_j^k)$ 385, namely the total amount of airtime utilized for slice j (e.g., MVNO#1) for all of its radios. HWV controller 175 is adapted to further receive airtime usage from other virtualized end points as well before performing airtime allocation.

In general, both flow scheduler 320 and traffic shaping logic 350 are adapted to receive, on its control path 390, current usage statistics from HWV controller 175, namely PHY rate for clients, airtime, number of MAC retries, etc.) and airtime allocation. On the data path, flow scheduler 320 and traffic shaping logic 350 shape incoming data traffic and send the shaped traffic to a target device (e.g. BTS 170 or AP 160). Multiple approaches may be using for traffic shaping operations.

A first approach involves flow scheduler 320 and traffic shaping logic 350 to use feedback information to calculate average PHY layer rate/goodput for every slice. Then, a shaping value is computed by multiplying the airtime allocation by this rate. The aggregate data traffic from the slice is shaped using the shaping value.

The second approach involves flow scheduler 320 and traffic shaping logic 350 computing the shaping value using feedback information as described above. However, data traffic is shaped to restrict airtime usage for the clients with the slowest PHY rates.

Figure 4:
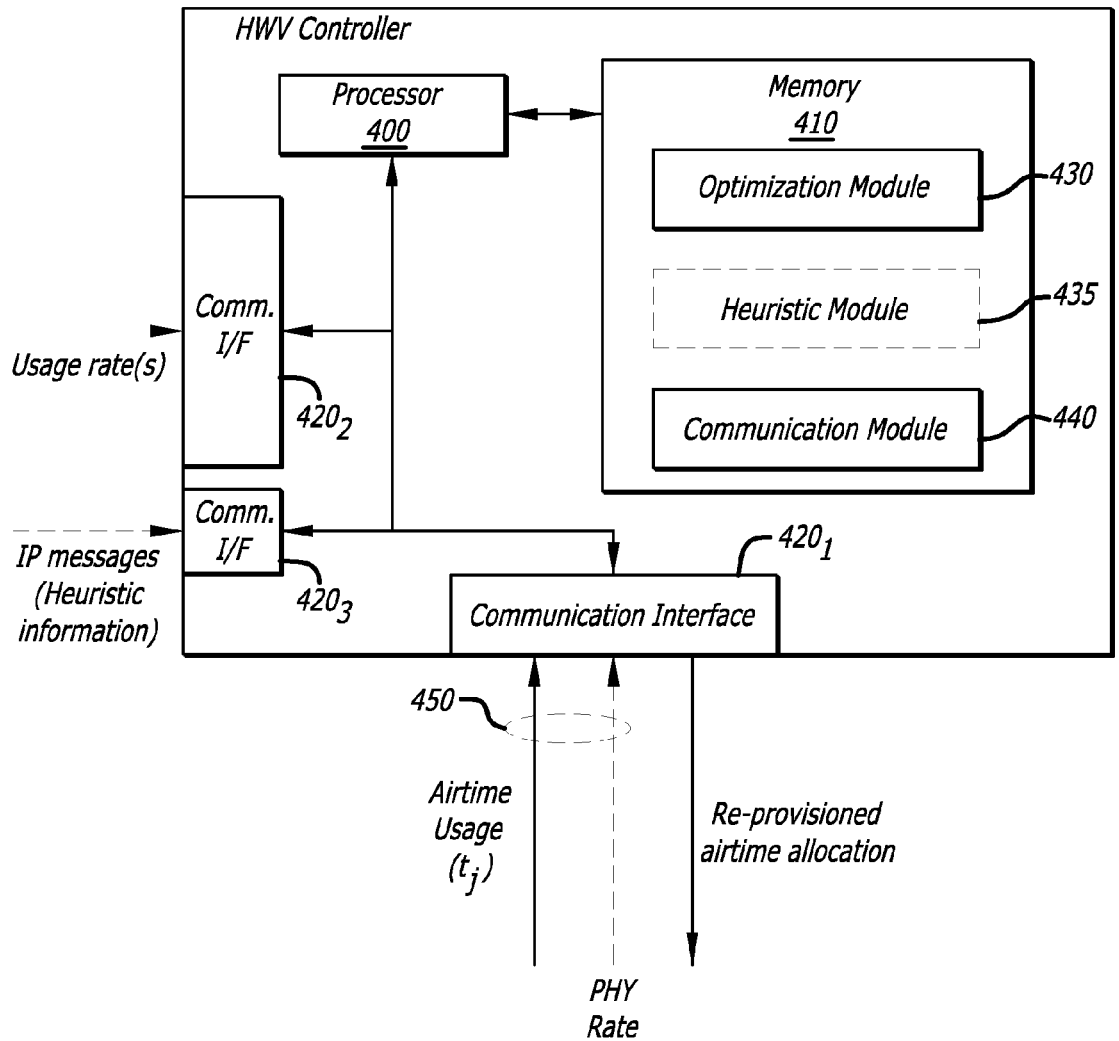
FIG. 4 is an exemplary illustration of logic within the HWV controller along with information flows with the wireless network devices.

FIG. 4 is an exemplary illustration of logic within HWV controller 175 that is adapted to receive control information from one or more wireless network devices in order to control the data flows from these devices. Herein, HWV controller 175 comprises a processor 400, a memory 410, and one or more communication interfaces $420_1$-$420_R$ (R≥1). Memory 410 includes an optimization module 430 and a communication module 440. Alternatively, in lieu of optimization module 430, a heuristic module 435 may be deployed as described below.

First communication interface $420_1$ is adapted to receive control information 450 from one or more wireless network devices (not shown). According to one embodiment of the disclosure, control information 450 includes airtime usage on a per slice basis. This would require the wireless network devices to compute and aggregate airtime usage for each data flow associated with each MVNO. Alternatively, the airtime usage on either a per data flow basis or per radio basis may be aggregated and provided to HWV controller 175, which would be adapted to aggregate the airtime usage on a per MVNO basis.

Optionally, first communication interface $420_3$ may be adapted to receive PHY rates for each of the wireless client devices associated with each MVNO. The PHY rates are used for assigning greater airtime to those wireless client devices that can support a higher PHY rate. This increases the overall data throughput of the hybrid wireless virtualization (HWV) system.

Second communication interface $420_2$ is adapted to receive rate information and usage rules for each MVNO. The usage rules define the amount of airtime reserved per allocation cycle by each MVNO. The amount of airtime may be in the form of a total prescribed time (e.g., hours, minutes, seconds, milliseconds, etc.) or may be in the form of a percentage of the total amount of airtime offered by the wireless network device. As an illustrative embodiment, for an allocation cycle of a prescribed duration, one MVNO may reserve one hour of airtime while another MVNO may reserve 20 minutes of airtime. As another illustrative embodiment, one MVNO may reserve twenty percent (20%) of the airtime while another MVNO may reserve five percent (5%) of the airtime.

According to one embodiment of the invention, such usage may be altered based on historical usage monitored by heuristic module 435. According to another embodiment of the invention, heuristic module 435 may be configured to operate as an approximation tool in lieu of optimization module 430. In particular, airtime allocations may be adjusted based on historical, static data. For instance, MVNOs with the highest lease rate may be configured with the highest allocation of data traffic. Similarly, the lowest percentage allocation of airtime may be received for slices (or client devices) having the lowest PHY rate (e.g. average PHY rate, median PHY rate, etc.).

Additionally, according to this embodiment, second communication interface 420₂ is adapted to receive rate information such as lease rates and/or predicted likelihood of recovery at prescribed lease rates based on MVNO factors (e.g., financial stability of MVNO, etc.). The lease rates may be linear (e.g. prescribed cost/unit of time) or non-linear. Non-linear lease rates may be decreasing or increasing as more airtime is purchased.

Third communication interface 420₃ is adapted to exchange Internet Protocol (IP) messages with an external web server so as to provide heuristic information such as airtime usage by each of the MVNOs for one or more previous airtime allocation cycles. Such usage information may be used for invoice generation or providing real-time accounting information to each of the MVNOs.

Within memory 410, optimization module 430, heuristic module 435 and communication module 440 are provided to control operations of HWV controller 175 with respect to optimized revenue generation and/or throughput aggregation.

Optimization module 430 is adapted to receive airtime usage and lease rate information associated with each MVNO utilizing wireless network devices. As previously stated, the airtime allocated per slice j at every wireless network device k may be represented as $t_j^k$ (base station) or $\hat{t}_j^k$. Furthermore, airtime quota, meaning a ratio of total airtime reserved by a particular slice, may be allocated differently for different base stations. The airtime quota may be specified for base station by $Q=\{Q_1, \ldots, Q_n\}$ and $\hat{Q}=\{\hat{Q}_1, \ldots, \hat{Q}_n\}$ for access points. The requested airtime per slice j per base station or access point is given as $r_j^k$ and $\hat{r}_j^k$, respectively. The requested airtime may be updated at runtime for every iteration at which the optimization module 430 is utilized. Corresponding usage flags for base station and access points are given as: $u_j^k$, and $\hat{u}_j^k$.

Optimization module 430 is also responsible for re-provisioning airtime allocations by the wireless network devices so that the network operator's profit is maximized and enforce group airtime fairness across slices.

The overall revenue function across the MNO-owned base station(s) and/or access point(s) is defined as the following, wherein $Rev(t_j^k)$ is directed to the revenue from airtime provided for support of cellular communications while $\hat{Rev}(\hat{t}_j^k)$ is directed to the revenue from airtime provided for support of wireless communications:

$$Rev(t_j^k) = t_j^k \times \Gamma_j(r_j^k) \quad (8)$$

$$\hat{Rev}(\hat{t}_j^k) = \hat{t}_j^k \times \hat{\Gamma}_j(\hat{r}_j^k) \quad (9)$$

According to one embodiment of the invention, the revenue functions, $Rev(t_j^k)$ and $\hat{Rev}(\hat{t}_j^k)$, may be linear when the lease rates are linear. As a result, the revenue determination may be conducted by multiplying the slice allocation for a particular resource (e.g., wireless network device) by a constant "C" that represents the cost per unit time. However, according to another embodiment of the invention, the revenue functions, $Rev(t_j^k)$ and $\hat{Rev}(\hat{t}_j^k)$, may be non-linear if the lease rate is non-linear, such as a convex relationship in which the leased amount per unit of airtime decreases or a concave relationship in which the leased amount per unit of airtime increases as more airtime is purchased. Also, a current utilization (or load)—amount of airtime used out of the assigned quota to balance allocations—may be used to improve overall system performance.

According to one embodiment of the invention, $\Gamma_j$ and $\hat{\Gamma}_j$ are utility of every slice allocation as the lease price which a $j^{th}$ MVNO will be willing to pay for prescribed airtime biased by the utilization of resource allocations in the previous allocation cycle. Hence, the incentive of an allocation for slice j on a wireless network device (WND) could be calculated as:

$$\Gamma_j = C_j \ast \text{prev\_alloc\_utilization}(j, WND) \quad (10)$$

$$BTS: \Gamma_j = C_j \ast \text{prev\_alloc\_utilization}(j, BTS) \quad (11)$$

$$AP: \hat{\Gamma}_j = \hat{C}_j \ast \text{prev\_alloc\_utilization}(j, AP) \quad (12)$$

The "prev_alloc_utilization(j, WND)" indicates the fraction of airtime used by the slice j on the wireless network device (WND). These equations indicate an increasing utility/incentive with increasingly allocated capacity. Eventually, the values $C_j$ and $\hat{C}_j$ can be equated to the average physical rates available for the wireless client devices belonging to the slices j supported by base stations and access points of the virtualized network, respectively. Upon simplifying equation (10) where the notation can be generalized for a situation where there are different radios (e.g., base stations, APs, wireless mesh routers, etc.), the lease rate a virtual operator j is willing to pay for the kth radio can be denoted as "C(j, k)". These values will be negotiated by the virtual operator with the carrier or infrastructure owner offline based on individual contracts or online based on some bidding scheme.

Therefore, the corresponding incentive functions and revenue functions can be calculated as the following:

$$\Gamma(j,k) = C(j,k) \ast \text{prev\_alloc\_utilization}(j,k) \quad (13)$$

Further the revenue functions would be calculated as the product of the incentive function and the actual allocation:

$$Rev(t_j^k) = t_j^k \times \Gamma_j(r_j^k) \quad (14)$$

$$\hat{Rev}(\hat{t}_j^k) = \hat{t}_j^k \times \hat{\Gamma}_j(\hat{r}_j^k) \quad (15)$$

Finally, the objective function performed at the HWV controller can be calculated as:

maximize $\sum_j \sum_k Rev(t_j^k) + \hat{Rev}(\hat{t}_j^k)$ — Sum of revenue for all airtime provided by wireless network devices (k) in all slices (j)

subject to $\sum_j t_j^k \leq 1, j = 1, \ldots, m.$ — Fraction of airtime provided by BTS radios for all slices is $\leq 1$ $\sum_k t_j^k \leq Q_j, k = 1, \ldots, n.$ — Fraction of airtime for slice j provided by each BTS shall be less than its assigned quota ($Q_j$)

$\forall_{j,k} \; t_j^k \geq \delta_j^k,$ — Each BTS "k" has a minimum amount of airtime.

$\sum_j \hat{t}_j^k \leq 1, j = 1, \ldots, m.$ — Fraction of airtime provided by AP radios for all slices is $\leq 1$ $\sum_k \hat{t}_j^k \leq \hat{Q}_j, k = 1, \ldots, n.$ — Fraction of airtime for slice j provided by each AP shall be less than its assigned quota ($Q_j$)

$\forall_{j,k} \; \hat{t}_j^k \geq \hat{\delta}_j^k,$ — Each AP "k" has a minimum amount of airtime.

In the above optimization solution, the "$\delta_j^k$" is used to represent the minimum airtime reservation at the base station k for the slice j and the "$\delta_j^{\wedge k}$" is used to represent the minimum airtime reservation at the access point k for the slice j. This optimization is performed based on linear constraints. However, it is contemplated that the optimization solution may be performed based on convex constraints with increased airtime utility or concave constraints with decreased airtime utility.

Figure 5A:
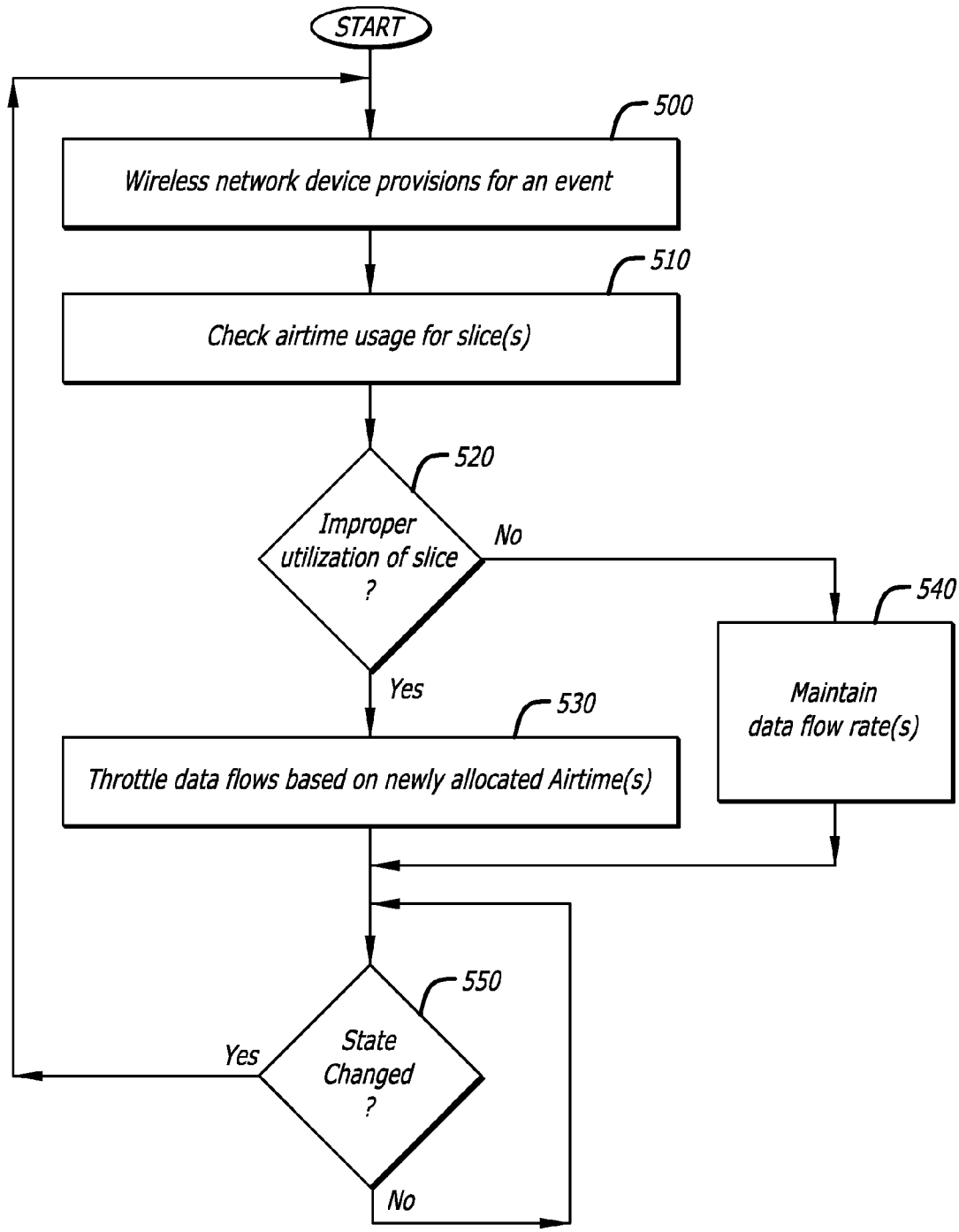
FIG. 5A is an exemplary flowchart illustrating operations between both a wireless client device and a wireless network device.

FIG. 5A is an exemplary flowchart illustrating operations between both a wireless client device and a wireless network device. Initially, the wireless network device provisions for an event (block 500). This may constitute determining current allocation virtualization for that particular wireless network device. Next, the wireless network device checks airtime usage for all wireless client devices across multiple groups (block 510).

Thereafter, a determination is made whether there are any violations to the current allocation virtualization based on the measured airtime usage (block 520). Such violations may include, but are not limited or restricted to a particular slice receiving airtime greater than or less than an allocated utilization rate.

If there is a violation such as improper utilization of airtime by the particular slice, data flows are throttled based on newly allocated airtime (block 530). Otherwise, the data flows are maintained with the same airtime usage breakdown (block 540).

This process is iterative (block 550). For instance, the process may be repeated periodically after a prescribed time interval has elapsed. Alternatively, the process may be period in response to an event such as a query from the HWV controller. This query may be initiated periodically or randomly by the HWV controller such as in response to an update airtime usage query to the HWV controller from a web service agent. Alternatively, the wireless network device may enter into a Sleep mode that, in response to an interrupt operating as a provisioning "event", causes the wireless network device to check airtime usage for the client devices.

Figure 5B:
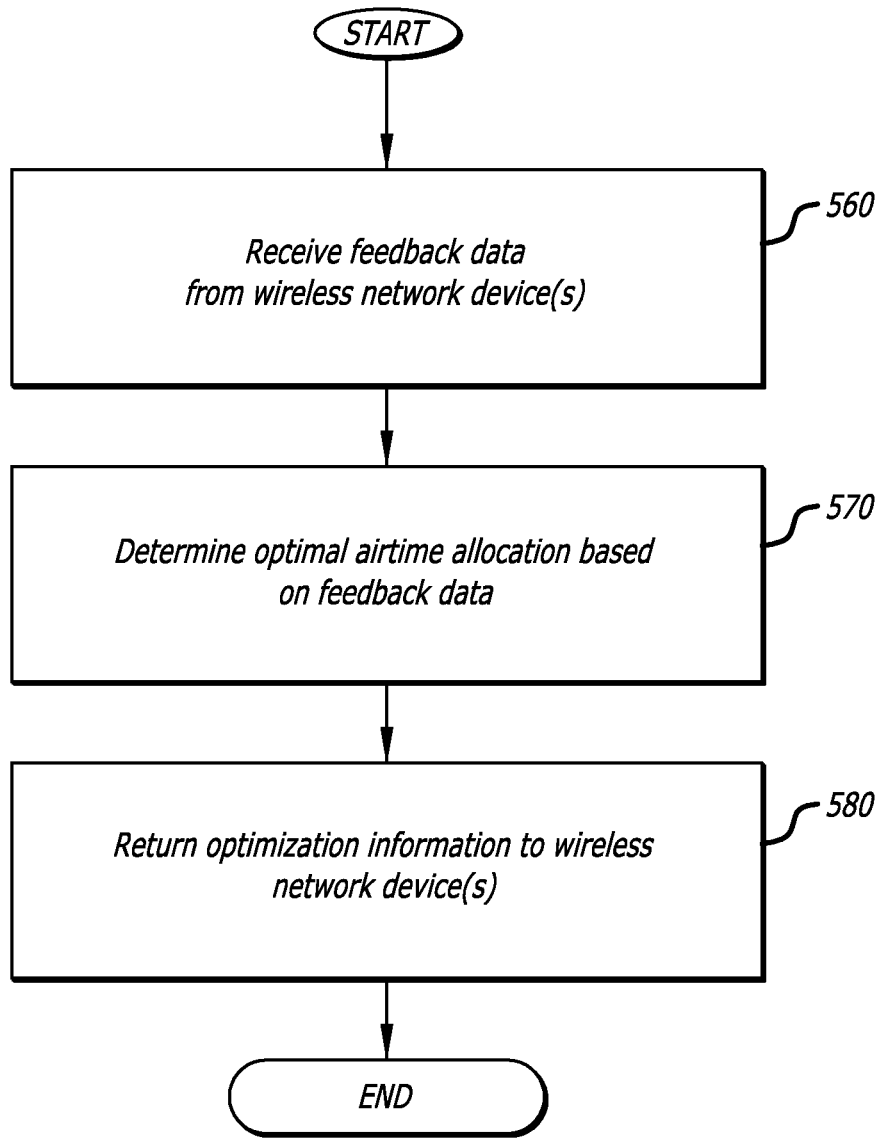
FIG. 5B is an exemplary flowchart illustrating operations between the wireless network device and the HWV controller.

FIG. 5B is an exemplary flowchart illustrating operations between the wireless network device and the HWV controller. Herein, the HWV controller receives feedback data from one or more wireless network devices (block 560). This feedback data may include airtime usage for each slice supported a wireless network device. The airtime usage may be a value representative of an amount of time, according to a selected unit of time, allocated to a particular slice (group of wireless client devices for a common MVNO).

Based on the feedback data, the HWV controller determines an optimal allocation of airtime based on the feedback data (block 570). The HWV controller receives the airtime usage and has access to payment rates for airtime usage for multiple types of communication (e.g., cellular, wireless, etc.) for a variety of different MVNOs. From this information, the HWV controller returns optimization information to the wireless network devices, where the optimization information is designed to allocate airtime among the slices in efforts to maximize revenue or achieve a maximum throughout rate (block 580).

Figure 6:
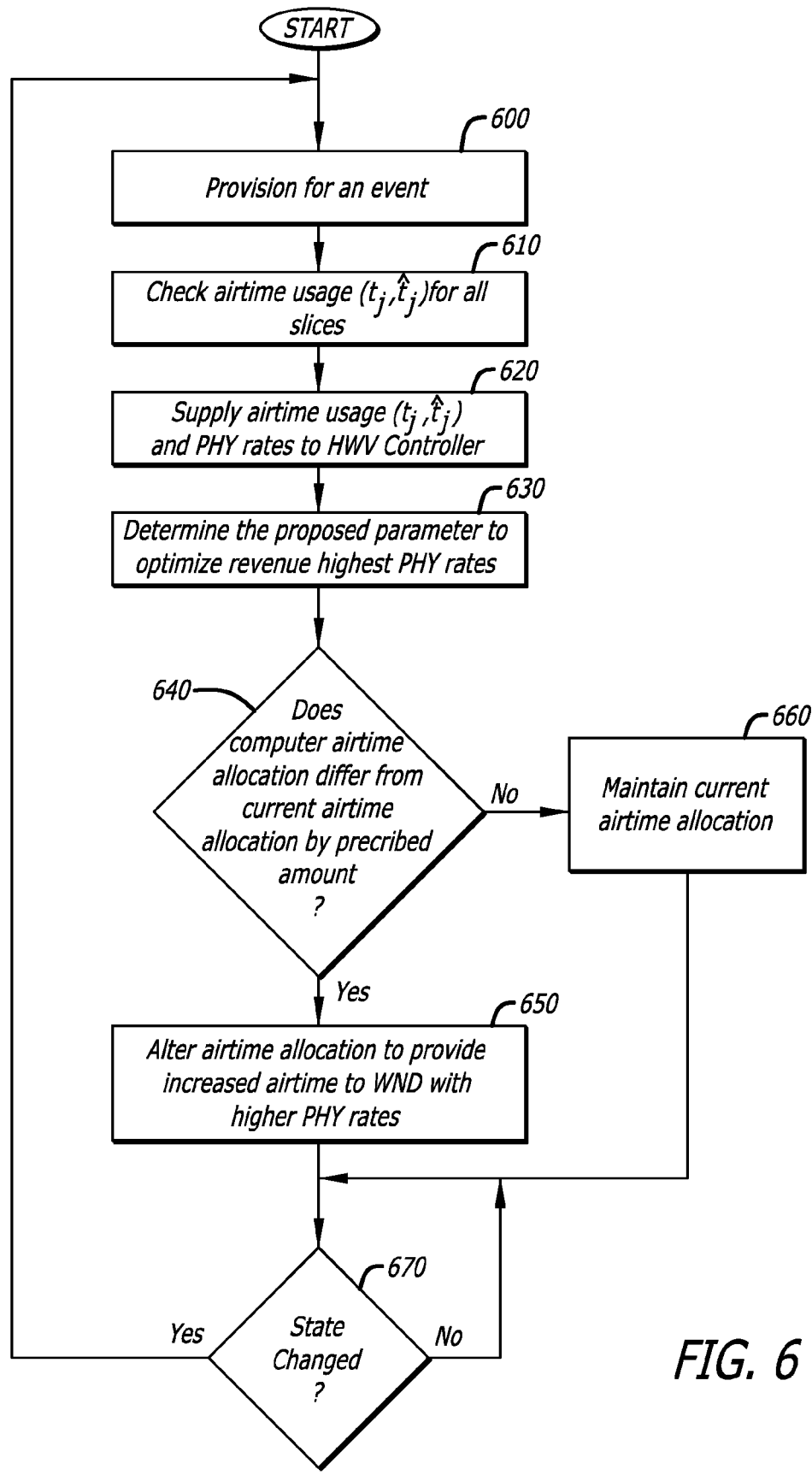
FIG. 6 is an exemplary flowchart illustrating operations performed by the HWV to optimize throughput over the MNO network of FIGS. 1 and 2.

FIG. 6 is an exemplary flowchart illustrating operations performed by the HWV controller to optimize throughput over the MNO network of FIGS. 1 and 2. Initially, the wireless network device provisions for an event (block 600). This may constitute an expiration of an allocation cycle and determining the virtualization scheme for that particular wireless network device. Next, the wireless network device checks airtime usage ($t_j$ or $t^{\wedge}_j$) for all slices and supplies the airtime usage to the HWV controller (blocks 610 and 620).

Next, a determination is made as to optimize revenue realized which may involve analysis of revenue parameters for a previous allocation cycle (block 630). Such a determination may involve analysis of parameters associated with each of the wireless client devices associated with slice j as well as other slices. Of course, the parameters analyzed may include PHY rates and perhaps other parameters such as MAC retries, signal strength measurements and revenue allocations of the wireless client devices. If the computed allocation differs from the current allocation by a prescribed amount (e.g., realized revenue is greater than a certain percentage), the airtime allocation is altered to increase airtime usage by slice j (blocks 640 and 650). Otherwise, the current airtime allocation will be maintained (block 640 and 660). These operations are iterative for each allocation cycle (block 670).

Figure 7:
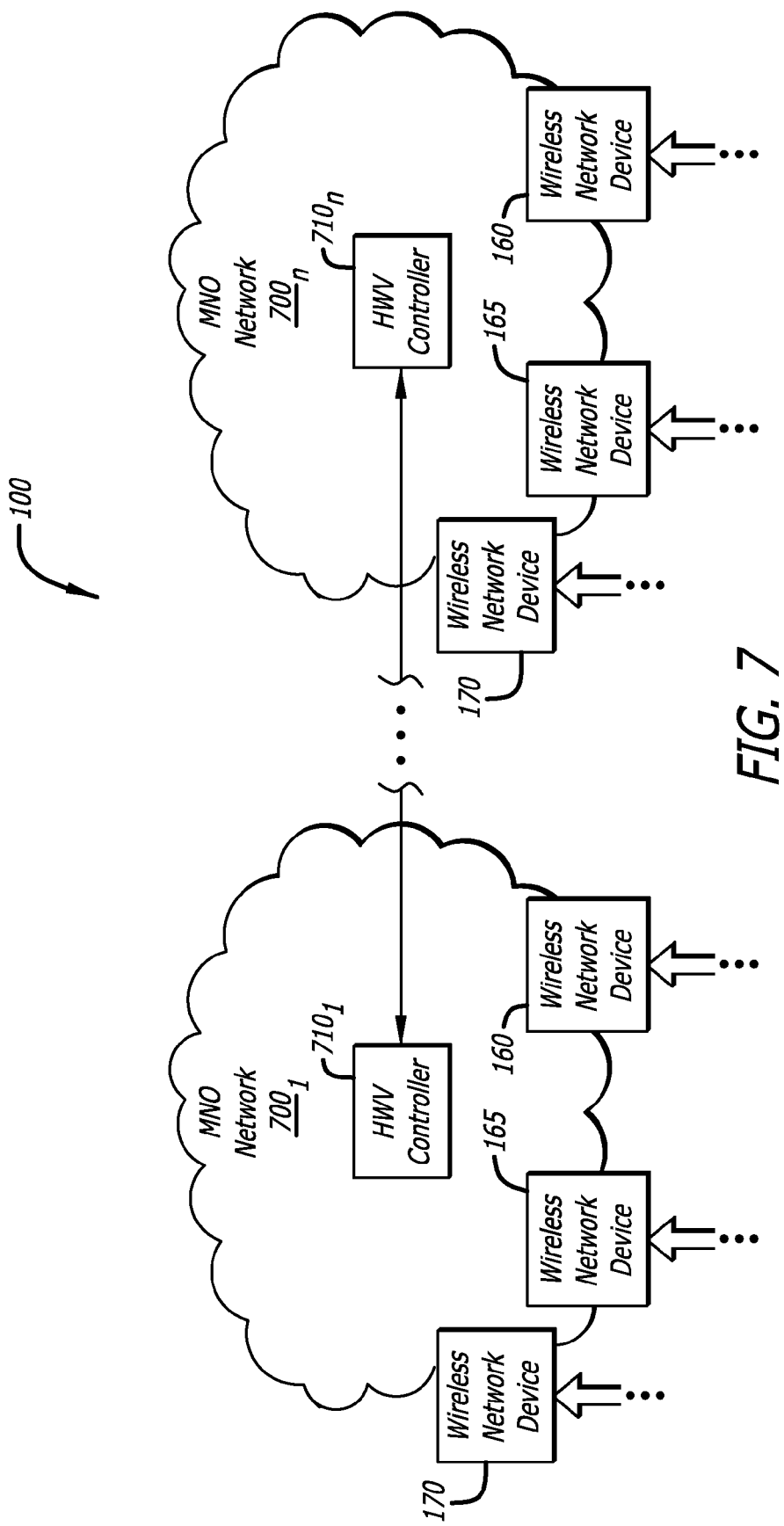
FIG. 7 is an exemplary embodiment of the virtualized network architecture of FIG. 1 with multiple MNO subnetworks forming a MNO network.

FIG. 7 is an exemplary embodiment of the virtualized network architecture of FIG. 1 with multiple MNO subnetworks $700_1$-$700_r$ (r>1) forming MNO network 100. Herein, each MNO subnetwork $700_1$, . . . , and $700_r$ comprises a HWV controller $710_1$, . . . , and $710_r$, and these HWV controller $710_1$-$710_r$ are in communication with each other. Each HWV controller $710_1$, . . . , and $710_r$ is adapted to provision and manage airtime usage for slices associated with its corresponding MNO subnetwork $700_1$, . . . , and $700_r$.

As described above, using MNO subnetwork $700_1$ for illustrative purposes, wireless network devices 160, 165 and 170 are communicatively coupled HWV controller $710_1$, which is adapted to receive and process control information from wireless network devices 160, 165 and 170. This control information may include a fraction of airtime ($t_j$) that is used in wireless communications with wireless client devices in slice j using radios implemented within wireless network devices 160, 165 and 170 as described above.

In order to optimize revenue realization across all the controllers in the network we would have to solve a distributed optimization. This may be accomplished by sharing information across multiple HWV controllers $710_1$-$710_r$. Additional information could be quota allocations previously performed so that HWV controllers $710_1$-$710_r$ could use this global information for enforcing more local constraints.

For example, say a slice is willing to pay for only ten hours of aggregate airtime. Upon reaching nine hours of airtime allocation and "r" is equal to six (i.e. six HWV controllers $710_1$-$710_6$ for the slice, each HWV controller $710_1$-$710_6$ could take this into consideration and limit slice's airtime to ten minutes each. This could also be made proportional to the number of wireless network devices, or the client devices or the traffic and usage patterns observed by the controllers.

HWV controllers $710_1$-$710_r$ could all operate in a distributed peer to peer fashion or use a standard elect a leader approach, where one controller acts as the master for the group by sending information to and collecting information from the other controllers. This election could be performed automatically, or could be performed manually by a system administrator. Alternative masters could also be assigned to avoid having a single point of failure in the system.

Figure 8:
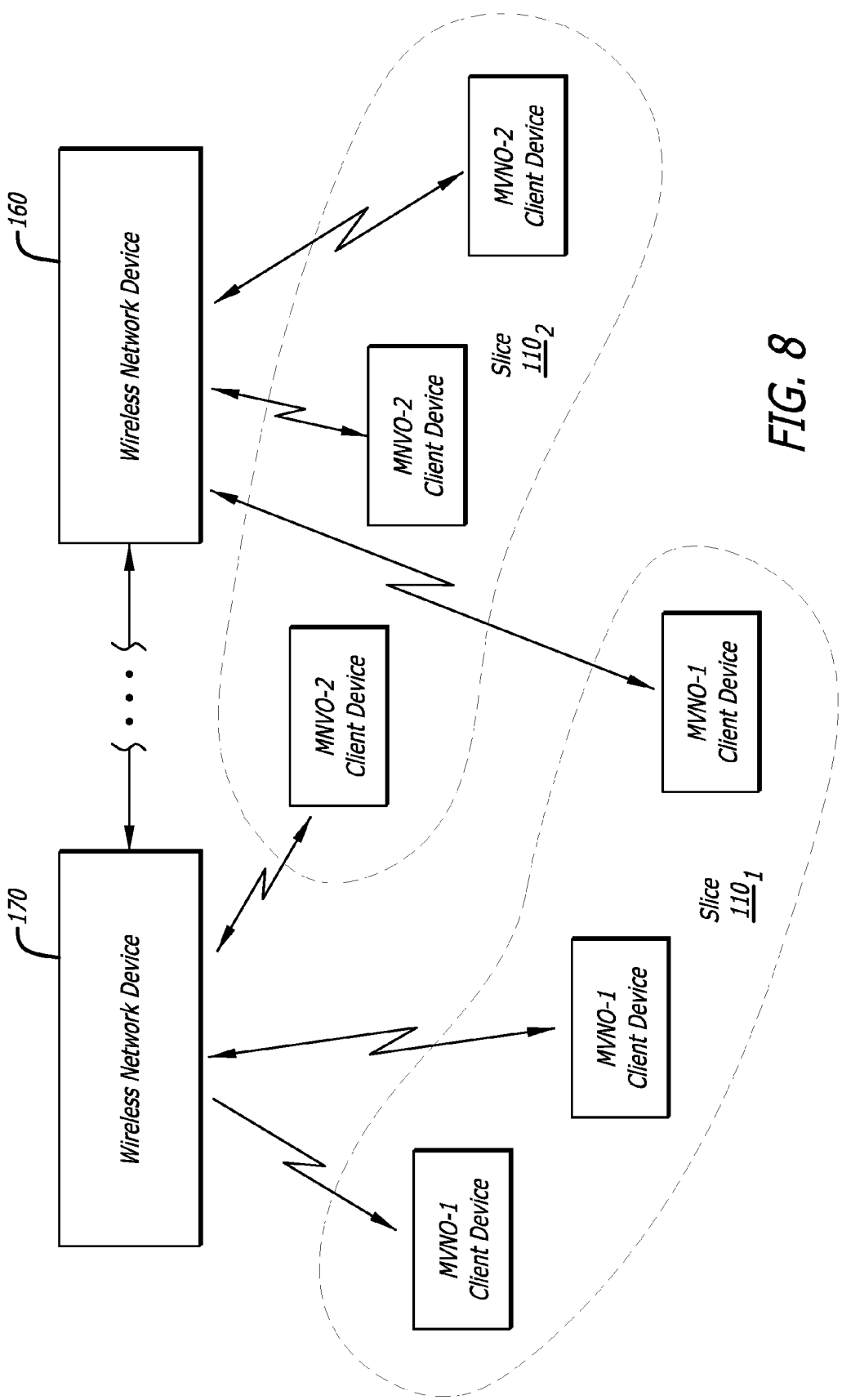
FIG. 8 is an exemplary embodiment of the virtualized network architecture of FIG. 1 with functionality of the HWV controller being implemented within the wireless network devices.

FIG. 8 is an exemplary embodiment of the virtualized network architecture 800 similar to FIG. 1, but with functionality of the HWV controller being implemented within wireless network devices 160, 165 and 170. As a result, wireless network devices 160, 165 and 170 would need to be in communication with each other in order to exchange airtime usage information so that allocation of the total airtime usage can proceed in accordance with the quota (Q) established.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A non-transitory computer readable medium comprising instructions which, when executed by one or more devices, causes performance of operations comprising:
receiving, by a hardware controller, a first control information comprising a first amount of airtime currently used for wireless communications by a first group of network devices, the first group of network devices includes at least a first network device including a radio that supports wireless communications;
receiving, by the hardware controller, a second control information comprising a second amount of airtime currently used for cellular communications by a second group of network devices, the second group of network devices includes at least a second network device including a radio that supports cellular communications that differ from the wireless communications;
computing, by the hardware controller, a third amount of airtime for allocating to the first group of network devices based at least on the first amount of airtime and prices per unit of airtime to be paid by at least one operator associated with the first group of network devices; and
allocating the third amount of airtime for communication with the first group of network devices.

2. The medium of claim 1, wherein the first control information comprises feedback data received from the first network device of the first group of network devices and the second control information comprises feedback data receives from the second network device of the second group of network devices.

3. The medium of claim 2, wherein the first network device is an access point and the second network device is a base station.

4. The medium of claim 1, wherein the first group of network devices comprises a plurality of network devices including the first network device and the second group of network devices comprises a plurality of network devices including the second network device.

5. The medium of claim 1, wherein the computing of the third amount of airtime is further based on prices per unit of airtime to be paid by at least one operator associated with the second group of network devices.

6. The medium of claim 1, wherein the first control information further comprises a physical layer (PHY) rate for at least the first network device, and wherein computing the third amount of airtime is further based on the PHY rate for the at least the first network device.

7. The medium of claim 1, wherein the first control information further comprises a number of media access control (MAC) retries for transmissions from at least the first network device, and wherein computing the third amount of airtime is further based on the number of MAC retries for transmission from the at least the first network device.

8. A device comprising:
at least one hardware processor;
a memory including logic which, when executed by the at least one hardware processor, causes the device to perform operations comprising:
receiving a first control information comprising a first amount of airtime currently used for wireless communications by a first group of network devices, the first group of network devices includes at least a first network device including a radio that supports wireless communications;
receiving a second control information comprising a second amount of airtime currently used for cellular communications by a second group of network devices, the second group of network devices includes at least a second network device including a radio that supports cellular communications that differ from the wireless communications;
computing a third amount of airtime for allocating to the first group of network devices based at least on the first amount of airtime and prices per unit of airtime to be paid by at least one operator associated with the first group of network devices; and
allocating the third amount of airtime for communication with the first group of network devices.

9. The device of claim 8, wherein the first control information comprises feedback data received from the first network device of the first group of network devices and the second control information comprises feedback data receives from the second network device of the second group of network devices.

10. The device of claim 9, wherein the first network device is an access point and the second network device is a base station.

11. The device of claim 8, wherein the first control information comprises the first amount of airtime that includes airtime for each radio of a plurality of radios implemented within the first network device.

12. The device of claim 8, wherein computing of the third amount of airtime is further based on prices per unit of airtime to be paid by at least one operator associated with the second group of network devices.

13. The device of claim 8, wherein the control information further comprises a physical layer (PHY) rate for at least the first network device, and wherein computing the third amount of airtime is further based on the PHY rate for the at least the first network device.

14. The device of claim 8, wherein the control information further comprises a number of media access control (MAC) retries for transmissions from at least the first network device, and wherein computing the third amount of airtime is further based on the number of MAC retries for transmission from the at least the first network device.

15. A method comprising:
receiving, by a controller, a first control information comprising a first amount of airtime currently used for wireless communication by at least a first network device that comprises a hardware processor and a radio that supports wireless communications;
receiving, by the controller, a second control information comprising a second amount of airtime currently used for cellular communications by at least a second network device that comprises a hardware processor and a radio that supports cellular communications that differ from the wireless communications
computing, by the controller, a third amount of airtime for allocating to at least the first network device based at least on the first amount of airtime and prices per unit of airtime to be paid by at least one operator associated with the first network device and the second amount of airtime and prices per unit of airtime to be paid by at least one operator associated with the second network device; and allocating the third amount of airtime for communication with at least the first network device including the radio that supports wireless communications,
wherein the controller comprises a hardware processor and memory that stores one or more software modules that, when executed by the hardware processor, computes the third amount of airtime and allocates the third amount of airtime.

16. The method of claim 15, wherein the first control information comprises feedback data received from at least the first network device and the second control information comprises feedback data receives from the second network device.

17. The method of claim 16, wherein the first network device is an access point and the second network device is a base station.

18. The method of claim 15 further comprising:
computing, by the controller, a fourth amount of airtime for allocating to at least the second network device based at least on the second amount of airtime and prices per unit of airtime to be paid by at least one operator associated with the second network device and the first amount of airtime and prices per unit of airtime to be paid by at least one operator associated with the first network device; and
allocating the fourth amount of airtime for communication with at least the second network device including the radio that supports cellular communications.

19. The method of claim 15, wherein the first control information further comprises a physical layer (PHY) rate for at least the first network device from a first group of network devices each including radios that support wireless communications, and wherein computing the third amount of airtime is further based on the PHY rate for the at least the first network device.

20. The method of claim 15, wherein the first control information further comprises a number of media access control (MAC) retries for transmissions from at least the first network device, and wherein computing the third amount of airtime is further based on the number of MAC retries for transmission from the at least the first network device.

* * * * *